Dec. 12, 1944.  J. GAULD  2,365,067
POWER TRANSMISSION
Filed July 22, 1940

INVENTOR
JOHN GAULD
BY
ATTORNEY

Patented Dec. 12, 1944

2,365,067

UNITED STATES PATENT OFFICE 2,365,067

POWER TRANSMISSION

John Gauld, Detroit, Mich., assignor to Vickers Incorporated, Detroit, Mich., a corporation of Michigan Application July 22, 1940, Serial No. 346,749

3 Claims. (Cl. 74—579)

This invention relates to power transmissions, particularly to those of the type comprising two or more fluid pressure energy translating devices one of which may function as a pump and another as a fluid motor.

The invention is more particularly concerned with fluid pumps and motors of the type having ball-jointed pistons and connecting rods.

It is an object of the present invention to provide an improved piston and connecting rod assembly wherein the ball joints are provided by swaging one-piece socket members around the connecting rod balls and wherein the socket members may be permanently attached to the pistons and to the connecting rod driving member by a deforming operation which provides an unfailing connection during the life of the machine and yet which may be readily detached by a simple machine operation without damaging other parts of the mechanism when the ball joints become excessively worn.

Further objects and advantages of the present invention will be apparent from the following description, reference being had to the accompanying drawing wherein a preferred form of the present invention is clearly shown.

Figure 1:
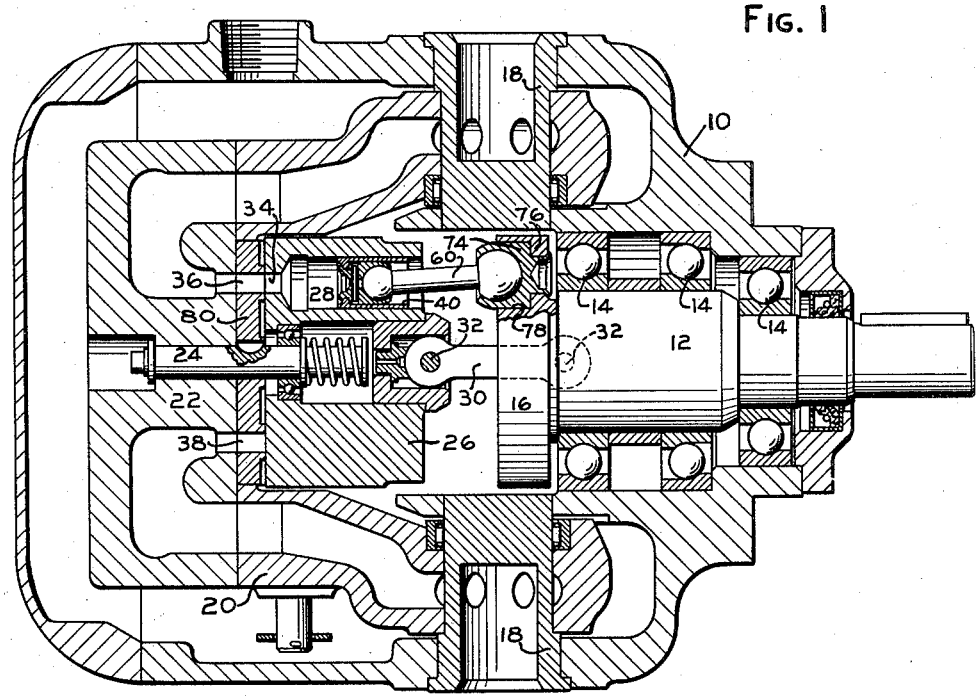
Figure 1 is a longitudinal cross section of a hydraulic pump or motor embodying a preferred form of the present invention.

The pump illustrated in Figure 1 is generally similar to that disclosed in the patent to Thoma, 1,931,969, and comprises a casing 10 having a drive shaft 12 journalled on bearings 14 therein. The shaft 12 is provided with a driving flange 16 at its inner end.

Oscillatably mounted on trunnions 18 in the casing 10 is a two-armed yoke 20, the arms of which are hollow for fluid connections, and the left hand end of which forms a valve plate 22. Journalled on a stationary shaft 24 in the yoke 20 is a revolving cylinder barrel 26 having an odd number of cylinders 28 therein. The cylinder barrel 26 is connected for rotation from the shaft 12 by a cardan shaft 30 having cardan joints 32 at its opposite ends. Each of the cylinders 28 has a cylinder port 34 which, in the course of one revolution, registers first with an arcuate inlet port 36 in the valve plate 22 and then with an arcuate discharge port 38 during the second half revolution. The hollow trunnions 18 are adapted to form inlet and outlet connections to and from the pump.

The present invention is particularly concerned with the piston and connecting rod construction about to be described. A piston 40 is formed by a hollow cylindrical sleeve or skirt 42 having both ends open and provided with an inwardly projecting flange 44 at its head end. The flange 44 is provided with a flat face 46 on the right hand end and a conical face 48 on its left side. Mounted within the skirt 42 is a one-piece socket member 50 which is provided with a hemispherical socket 52 which forms the terminus of a recess 54 which is originally of cylindrical form. The thin walls 56 of the recess are deformed by a swaging operation to embrace the ball end 58 of a connecting rod 60 as illustrated.

At its opposite end the socket member 50 is provided with a second cylindrical recess 62 of smaller diameter and having thin walls 64 which are adapted to be deformed into engagement with the conical face 48 of the flange 44. The outer surface of the socket member 50 is provided with a shoulder at 66 for abutting the flat face 46 of the flange 44. Suitable lubrication passages 68 may be provided together with a pin type check valve 70 for lubrication purposes.

At its opposite end the connecting rod 60 is provided with a ball end 72 on which is mounted a second socket member 74 similar to the member 50 without the lubrication provisions. The corresponding parts are deformed into engagement with the ball end 72 and with an inwardly facing flange 76 in the driving flange 16. The flanges 76 are formed at the right hand end of cylindrical recesses 78 in which the socket members 74 are adapted to be received.

The operation of the pump is well-known to the art and is fully described in the patent previously referred to. The present invention is particularly suitable for use in pumps where the cylinder barrel 26 is constructed of bronze or other suitable bearing material as distinguished from steel and wherein the valve plate 22 has a surface plate 80 formed of steel or other similar metal. Thus, the piston skirts 42 may be constructed of steel as is also the connecting rod 60 and the shaft 12 with its flange 16. The socket members 50 and 74 are then formed of bearing bronze, and it is thus insured that dissimilar metals are associated at all rubbing surfaces of the machine.

Figure 2:
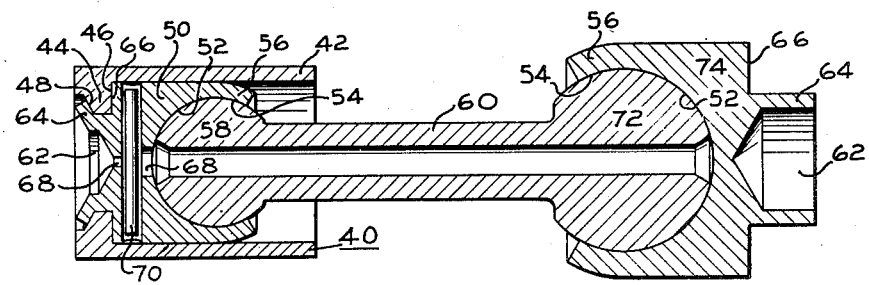
Figure 2 is a fragmentary cross section of a piston and connecting rod assembly used in the construction of Figure 1.

As occurs in all mechanisms after a certain useful life, the parts become worn, and it is a common occurrence that the ball connecting rod joints frequently become worn before other parts of the mechanism do so. They may then be readily replaced with new assemblies, as illustrated in Figure 2, by merely applying a large twist drill to the deformed wall 64 of the socket member 74 without, however, damaging the flange 16.

While the form of embodiment of the invention as herein disclosed constitutes a preferred form, it is to be understood that other forms might be adopted, all coming within the scope of the claims which follow.

What is claimed is as follows:

1. A piston and connecting rod assembly for hydraulic pumps and motors comprising a piston skirt having an inwardly projecting flange adjacent the head end thereof, a one-piece ball socket within the skirt and deformed to engage both sides of said flange, a one-piece, ball-ended connecting rod mounted in the socket, a second one-piece ball socket on the opposite end of the connecting rod, and means on said second socket deformable to embrace a similar inwardly projecting flange on a piston driving member.

2. A piston and connecting rod assembly for hydraulic pumps and motors comprising a piston skirt having an inwardly projecting flange adjacent the head end thereof, a one-piece ball socket within the skirt and deformed to engage both sides of said flange, a one-piece, ball-ended connecting rod mounted in the socket, a second one-piece ball socket on the opposite end of the connecting rod, and means on said second socket deformable to embrace a similar inwardly projecting flange on a piston driving member, at least one of said sockets having its deformed portion shaped to receive a twist drill point whereby the deformed portion may be drilled away without harming the member in which it is mounted.

3. A piston for use in a pump or motor having a ball-ended connecting rod comprising in combination a skirt member of hollow cylinder form, open at both ends, and a one-piece ball socket member filling said skirt to close one end thereof, said socket member being deformed at one end to engage the skirt and separately deformed at its opposite end to engage the ball end of a connecting rod.

JOHN GAULD.